# 2,722,525

POLYMERIZABLE COMPOSITIONS CONTAINING AN UNSATURATED CARBONATE AND POLYMERIZATION PRODUCTS THEREOF

John A. Price, Stamford, and John J. Padbury, Springdale, Conn., assignors to American Cyanamid Company, New York, N. Y., a corporation of Maine No Drawing. Application May 7, 1953,
Serial No. 353,666

1 Claim. (Cl. 260—77.5)

This invention relates to the production of new materials having valuable and characteristic properties that make them especially suitable for use in industry, for example in molding, casting, coating, electrically insulating, adhesive and fiber-forming applications, as intermediates for producing other synthetic materials, and for other purposes. More especially the invention is concerned with polymerizable and polymerized composition comprising, as essential components, vinylene carbonate and one or more other unsaturated (including ethylenically unsaturated) substances which are copolymerizable therewith, and more particularly those ethylenically unsaturated substances containing a $CH_2=C<$ grouping, that is, either a single $CH_2=C<$ grouping or a plurality of $CH_2=C<$ groupings.

Still more particularly the present invention is concerned with polymerizable compositions comprising (1) vinylene carbonate and (2) a compound which is copolymerizable with the compound of (1) and which is represented by the general formula I 

where R represents a member of the class consisting of hydrogen, halogen, and alkyl, cycloalkyl and aryl radicals, and R' represents a radical of the class consisting of aryl and alkaryl radicals, and radicals represented by the formulas (a)       $-\underset{H}{\overset{|}{C}}=CH_2$ (b)       $-C\equiv N$ (c)       $-O-\overset{O}{\underset{\|}{C}}-R''$ (d)       $-\overset{O}{\underset{\|}{C}}-OR''$ (e)       $-\overset{O}{\underset{\|}{C}}-R''$ where R" represents a radical of the class consisting of alkyl, alkoxyalkyl and carbocyclic radicals. The invention claimed in the instant case is directed specifically to a composition comprising a copolymer of copolymerizable ingredients including vinylene carbonate, acrylonitrile, acrylamide and allyl gamma-stearamidopropylmorpholinium bromide, said copolymerizable mixture containing approximately 91.0 molar per cent of acrylonitrile, 5.3 molar per cent of vinylene carbonate, 3.2 molar per cent of acrylamide and 0.5 molar per cent of allyl gamma-stearamidopropylmorpholinium bromide.

Vinylene carbonate, which is a cyclic carbonate of an enediol, has the following formula:

II 

Pure vinylene carbonate is a colorless liquid, M. P. 22° C., and B. P. 162° C. at 735 mm. It can be prepared, for example, by the dehydrochlorination of monochloroethylene carbonate in accordance with the following equation:

III 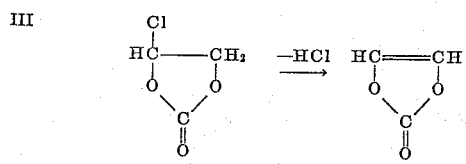

The reaction can be carried out, for instance, by adding small portions of triethylamine in dry ether, over a prolonged period, to a refluxing solution of monochloroethylene carbonate in dry ether, and then refluxing and stirring the reaction mass for about 16 hours. After filtering off the solids (mainly triethylamine hydrochloride) and washing with ether, the washings are combined with the filtrate. The ether is evaporated off and distillation of the residue yields a colorless liquid, B. P. 76–79° C. at 37 mm. From this liquid pure vinylene carbonate is obtained upon further rectification.

It was known prior to the instant invention that vinylene carbonate could be polymerized alone to yield a clear, colorless, solid homopolymer, and that such a homopolymer could be hydrolyzed to obtain water-soluble polymeric material. However, to the best of our knowledge and belief, it was not known or suggested prior to our invention that copolymer compositions having improved properties could be produced by copolymerization of copolymerizable ingredients including vinylene carbonate and a compound of the aforementioned kind, more particularly a compound of the kind embraced by Formula I. By using these particular comonomers in the particular range of proportions hereinafter given, new and valuable copolymer compositions are produced. These copolymers have particular and peculiar properties that make them eminently suited for a wide range of industrial applications. For example, our new copolymers of acrylonitrile and vinylene carbonate have better hydrophilic properties than homopolymeric acrylonitrile. Hence these new acrylonitrile copolymers are especially useful in the production of continuous-filament yarns and staple fibers having improved hydrophilic and other useful characteristics, and which tend to be more dye-receptive to a wider variety of dyes than similar yarns and fibers produced from homopolymeric acrylonitrile. This was quite surprising and unexpected and in no way could have been predicted.

It is a primary object of the present invention to prepare a new class of copolymers or interpolymers for use in industry.

Another object of the invention is to widen the field of utility of vinylene carbonate, which heretofore, to the best of our knowledge and belief, has not been employed in any commercial applications.

Still another object of the invention is to provide a new and valuable class of fiber-forming materials, especially those of the modified polyacrylonitrile type.

A further object of the invention is to provide a new class of potentially reactive copolymers that can be used as intermediates in the synthesis of other new and valuable compositions.

Still other objects of the invention will be apparent to those skilled in the art from the description and examples which follow.

We have found that the foregoing objects can be attained by polymerization of a polymerizable mixture of particular proportions of copolymerizable compounds including (1) vinylene carbonate and (2) one or more ethylenically unsaturated compounds containing a $CH_2=C<$ grouping; and more particularly a polymerizable mixture which includes particular proportions of (1) vinylene carbonate and (2) a compound (or a plurality of compounds, e. g., two, three, four or any desired or required number needed to impart particular properties to the copolymer) represented by the aforementioned Formula I, that is,

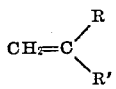

where R represents a member of the class consisting of hydrogen, halogen (chlorine, fluorine, bromine or iodine), alkyl (e. g., methyl, ethyl, propyl, butyl to octadecyl, inclusive), cycloalkyl (e. g., cyclopentyl, cyclohexyl, cycloheptyl, etc.), aryl (e. g., phenyl, xenyl, naphthyl, etc.), alkaryl (e. g., tolyl, xylyl, ethylphenyl, etc.), aralkyl (e. g., benzyl, phenylethyl, etc.) and R' represents an aryl radical, an alkaryl radical, or a radical represented by the formula

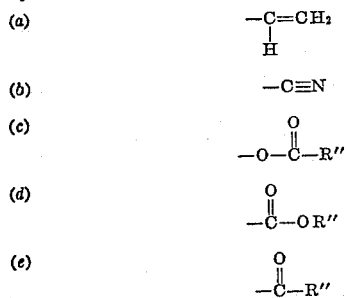

where R" represents an alkyl, alkoxyalkyl (e. g., methoxymethyl, methoxyethyl, ethoxyethyl, ethoxypropyl, propoxybutyl, etc.) or a carbocyclic radical (e. g., aryl, alkaryl, hydroaromatic, etc.). Examples of compounds embraced by Formula I are the vinyl esters (e. g., vinyl acetate, vinyl propionate, vinyl butyrate, etc.), methyl vinyl ketone, ethyl vinyl ketone, isoprene, 1,3-butadiene, 2-chloro-1,3-butadiene, acrylonitrile, methacrylonitrile, phenylacrylonitrile, various esters of acrylic acid (e. g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art from Formula I and the definitions of R, R' and R" hereinbefore given.

The present invention is based on our further discovery that the vinylene carbonate of (1), supra, and the comonomer or comonomers of (2), supra, should be employed in certain proportions; more particularly, the ingredients of (1) and (2) should be present in the polymerizable composition in the ratio of from 5 to 50 molar percent of the former to from 95 to 50 molar percent of the latter thereby to obtain, most readily and economically, copolymers having optimum properties for the usual service applications. For certain purposes, as for example when it may be desirable to produce a special copolymer having limited applications, the use of proportions outside the aforementioned molar percentages is not precluded. Thus, one could select comonomers having copolymerization characteristics such that molar percentages outside the aforementioned range would yield useful copolymers, for instance from about 2 or 3 to about 60 (or even as high as, say, 70 or 75) molar percent of vinylene carbonate to from about 97 or 98 to about 40 (or even as low as, say, 30 or 25) molar percent of a comonomer or comonomers of the kind hereinbefore set forth, more particularly one or more of the compounds embraced by Formula I.

Heat, light or heat and light can be used to effect or to accelerate polymerization of the mixture of comonomers, although under such conditions the rate of polymerization may be relatively slow. Hence, it is usually preferred to accelerate the polymerization by employing a polymerization catalyst accompanied by heat, light or heat and light. Ultraviolet light is more effective than ordinary light.

Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Catalysts which accelerate polymerization as the result of the liberation of a free radical, e. g., sym.-dicyanotetramethylazomethane and similar known diazo polymerization catalysts, can be employed. Various reduction-oxidation ("redox") catalyst systems also can be used advantageously in many instances. Other examples of organic peroxide and of other catalysts that can be employed are given, for example, in Drechsel and Padbury Patent No. 2,550,652, dated April 24, 1951.

The concentration of the catalyst employed is usually small, that is, for the preferred catalysts from, by weight, about 0.5 to 1 part of catalyst per thousand parts of the polymerizable composition to be polymerized to about 3 or 4 or more parts of catalyst per 100 parts of the mixture of comonomers.

If desired, the mixed monomers can be polymerized in emulsion or in solution state to yield a copolymer. In the latter case, various inert organic solvents may be employed, depending upon the particular comonomer used, e. g., toluene, xylene, dioxane, ethers (e. g., dibutyl ether), esters (e. g., butyl acetate), chlorobenzene, ethylene dichloride, ketones (e. g., methyl ethyl ketone), tertiary alcohols, for instance tertiary-butyl alcohol, tertiary-amyl alcohol, tertiary-hexyl alcohol, etc., as well as others. When the reaction is effected in solution state, then a temperature at or approaching the boiling temperature of the solution generally is used. The copolymer can be separated from the liquid medium in which copolymerization was effected by any suitable means, e. g., by filtration, centrifuging, solvent extraction, etc.

The polymerization also can be effected by conventional bulk polymerization technique, in the presence or absence of a solvent capable of dissolving the monomeric mixture and in which the latter preferably is inert; or in solution in a solvent in which the monomeric mixture is soluble but the copolymer is insoluble; or by conventional bead polymerization methods. The polymerization of the mixture of monomers can be effected by a continuous process as well as by a batch operation. In one method of copolymerization, which is generally satisfactory, the monomers are copolymerized in an aqueous medium, with the aid of a polymerization catalyst, and the resulting copolymer is then isolated by any suitable means, e. g., by filtration, centrifuging, etc., from the aqueous medium in which polymerization has been effected.

The temperature of polymerization of the polymerizable composition, at atmospheric or slightly above atmospheric pressure and in the presence or absence of a polymerization catalyst, can be varied over a wide range, up to and including or slightly above the boiling point (at atmospheric pressure) of the monomeric mixture (or of the lowest boiling component thereof), but in all cases is below the decomposition temperature of the monomeric materials. In most cases the polymerization temperature will be within the range of 25° C. to 150° C., more particularly within the range of about 30° C. to about 130° C., depending, for example, upon the particular mixture of monomers employed, the particular catalyst, if any, used, the rapidity of polymerization wanted, and other influencing factors.

In order that those skilled in the art may better understand how the present invention can be carried into effect, the following examples are given by way of illustration and not by way of limitation. All parts and percentages are by weight unless otherwise stated.

*Example 1*

A reaction vessel equipped with a stirrer, reflux condenser, thermometer and gas-inlet tube, is placed in a constant-temperature bath which is maintained at 35° C. To the vessel is added a solution of 45 parts of acrylonitrile, 5 parts of vinylene carbonate, 800 parts of water, and 0.05 part of sulfuric acid. This is in a ratio of about 93.6 molar percent of acrylonitrile to about 6.4 molar percent of vinylene carbonate. The pH of the initial solution is 3. A rapid stream of pre-purified nitrogen is passed over the surface of the solution for 30 minutes. The nitrogen flow is then reduced to about two or three bubbles per second. A reduction-oxidation catalyst system ("Redox" system) is prepared by dissolving 1.71 parts of ammonium persulfate and 0.71 part of sodium meta-bisulfite, each in 100 parts water. The catalyst solutions are added portion-wise to the reaction vessel at 25-minute intervals over a period of 2½ hours. After a total reaction period of 4 hours, the copolymer which forms is collected on a Büchner funnel, washed with 1000 parts of water and dried in an oven at 70° C. for 3 hours. Forty-five (45) parts of a dry, white copolymer of acrylonitrile and vinylene carbonate is obtained. A film cast from a 10% solution of this copolymer in dimethylformamide is clear, tough, and pliable.

*Example 2*

|  | Parts | Approx. Molar Percent |
|---|---|---|
| Vinylene carbonate | 8.6 | 50 |
| Ethyl acrylate | 10.0 | 50 |
| Benzene | 20.0 |  |
| Benzoyl peroxide | 0.2 |  | are heated together under reflux at the boiling temperature of the mass for 5 hours. A viscous solution containing a copolymer of ethyl acrylate and vinylene carbonate is obtained. Films dried from the benzene solution of the copolymer are clear and tough. The copolymer of this example is suitable for use as a component of coating compositions.

Instead of ethyl acrylate other comonomers, more particularly other esters of acrylic acid, e. g., methyl acrylate, propyl acrylate, isopropyl acrylate, n-butyl acrylate, isobutyl acrylate, sec.-butyl acrylate, tert-butyl acrylate, amyl acrylate, hexyl acrylate, propenyl acrylate, cyclohexyl acrylate, phenyl acrylate, benzyl acrylate, etc., can be substituted in the above formulation thereby to obtain copolymer compositions of varying properties. As with ethyl acrylate, so too with such other comonomers the proportions of components can be widely varied within the range of from 5 to 50 molar percent of the vinylene carbonate to from 95 to 50 molar percent of the other comonomer or comonomers.

*Example 3*

|  | Parts | Approx. Molar Percent |
|---|---|---|
| Styrene | 166.4 | 80 |
| Vinylene carbonate | 34.4 | 20 |
| 25% solution of dioctyl sodium sulfosuccinate in water | 20.0 |  |
| Water | 580.0 |  |
| Ammonium persulfate | 0.1 |  | are charged to a 3-necked reaction vessel equipped with a stirrer and a reflux condenser. The mixture is stirred vigorously while heating on a steam bath for 90 minutes, at the end of which period refluxing has ceased. Steam is now passed through the emulsion for 15 minutes to remove residual monomers. A small amount of coagulated copolymer is filtered out of the emulsion of the copolymer of styrene and vinylene carbonate.

The copolymer latex may be used as a coating composition or as a component of such compositions. For example, it may be applied to a surface of glass, metal, wood or other material to be protectively finished, and the coated article then heated for from 1 to 3 hours at a temperature of the order of 120° C. to 140° C. to evaporate the water and to harden the copolymer.

The copolymer may be precipitated, if desired, from the aqueous emulsion thereof by adding a coagulating agent such, for instance, as salts (e. g., salts of polyvalent metals such as aluminum sulfate, magnesium chloride, barium chloride, etc., salts of monovalent metals such as sodium chloride, sodium sulfate, etc.), acids, e. g., formic acid, acetic acid, phosphoric acid, hydrochloric acid, etc., sulfides, e. g., magnesium sulfide, etc. The coagulated copolymer is separated from the aqueous phase, waterwashed, and freed from entrapped water, for example by working on rolls to press out the water, followed by drying at a suitable temperature (e. g., at room temperature) under atmospheric pressure (preferably in a stream of dry air) or at subatmospheric pressures to remove the last traces of water. The dried copolymer, alone or with a dye, pigment, filler, plasticizer, lubricant or other modifying agent, may be molded under heat and pressure, e. g., at 140° C. to 170° C. and under a pressure of 2000 to 5000 pounds per square inch.

*Example 4*

To a reaction vessel are added 10 parts of acrylonitrile, 10 parts of vinylene carbonate and 0.2 part of α,α'-azodiisobutyronitrile. This is in the ratio of about 62 molar percent of acrylonitrile to about 38 molar percent of vinylene carbonate. The vessel is closed and heated in a water bath at a temperature of 70° C. for 30 minutes. Polymerization is essentially complete at the end of this time. A good yield of tan-colored acrylonitrile-vinylene carbonate copolymer is obtained.

*Example 5*

|  | Parts | Approx. Molar Percent |
|---|---|---|
| Dimethyl styrene | 180 | 85.5 |
| Vinylene carbonate | 20 | 14.5 |
| Benzoyl peroxide | 1 |  | yield a clear, viscous copolymer of dimethyl styrene and vinylene carbonate when heated together for 48 hours at 100° C.

Example 6

|  | Parts | Approx. Molar Percent |
| --- | --- | --- |
| Ethyl acrylate | 90 | 88.6 |
| Vinylene carbonate | 10 | 11.4 | are dissolved together, and the resulting solution is then added to

| | Parts |
| --- | --- |
| Sodium lauryl sulfate | 1.5 |
| Ammonium persulfate | 0.5 |
| Deionized water | 300.0 |

The resulting mixture is heated with stirring in a reaction vessel placed on a steam bath for 1½ hours, after which stirring is stopped, and steam is passed rapidly through the mass for 15 minutes in order to remove unreacted monomers. The steamed emulsion is cooled and strained to remove lumps of coagulated copolymer. A portion of the emulsion is diluted with water to 10% solids and is used to impregnate woolen fabrics. The impregnated cloth is dried for 10 minutes at 300° F. and is tested for shrinkage after being given five successive standard washings in a soap solution. The treated wool shrinks less than the untreated wool.

Example 7

Forty parts of methyl acrylate, 10 parts of vinylene carbonate and, in addition, 0.2 part of α,α'-azodiisobutyronitrile are charged to a reaction vessel. This is in the ratio of 80 molar percent of methyl acrylate to 20 molar percent of vinylene carbonate. The vessel is closed and heated in a water bath at 80° C. for one hour. A water-white, acetone-soluble, transparent, solid copolymer of methyl acrylate and vinylene carbonate is obtained.

Example 8

|  | Parts | Approx. Molar Percent |
| --- | --- | --- |
| Vinylene carbonate | 70.0 | 45.3 |
| Methoxyethyl acrylate | 110.0 | 47.0 |
| 4-Allyloxymethyl-1,3-dioxolane | 20.0 | 7.7 |
| 25% solution of dioctyl sodium sulfosuccinate in water | 40.0 | |
| Water | 760.0 | |
| 30% aqueous solution of hydrogen peroxide | 2.2 | |

The same general procedure is followed as described under Example 3. Stirring and heating under reflux are continued for 5 hours, after which the emulsion is steamed for 1 hour to remove unpolymerized monomers. The resulting product is a fairly stable emulsion of reactive copolymer, which may be used, for example, as a coating composition or as a component of such compositions.

Example 9

|  | Parts | Approx. Molar Percent |
| --- | --- | --- |
| Methyl methacrylate | 55 | 51.3 |
| Vinylene carbonate | 45 | 48.7 |
| Benzoyl peroxide | 1 | | are mixed together and charged to a heavy-walled glass tube, which thereafter is sealed under vacuum. Copolymerization is effected by heating the sealed tube in a 60° C. water bath for 24 hours. The resulting hard copolymer can be molded under heat and pressure to yield a wide variety of molded articles for domestic and industrial use.

Example 10

|  | Parts | Molar Percent |
| --- | --- | --- |
| Vinyl acetate | 50 | 50 |
| Vinylene carbonate | 50 | 50 |
| Benzoyl peroxide | 1 | | are copolymerized in the same manner as described under Example 9 to yield a copolymer of vinyl acetate and vinylene carbonate.

Example 11

To a reaction vessel are added forty parts of styrene, 10 parts of vinylene carbonate, and 0.2 part of α,α'-azodiisobutyronitrile. This is in the ratio of about 76.8 molar percent of styrene to about 23.2 molar percent of vinylene carbonate. The vessel is closed and heated in a water bath at a temperature of 80° C. for 8 hours. A solid, benzene-soluble copolymer of styrene and vinylene carbonate is obtained.

Example 12

To a reaction vessel equipped with a reflux condenser are added 6 parts of vinyl propionate, 2 parts of vinylene carbonate, and 0.04 part of benzoyl peroxide. This is in the ratio of about 72.2 molar percent of vinyl propionate to about 27.8 molar percent of vinylene carbonate. The solution is heated on a steam bath for 90 minutes. An additional 0.04 part of benzoyl peroxide is added and heating is continued for an additional 90 minutes. At the end of this time, a viscous, amber-colored copolymer of vinyl propionate and vinylene carbonate is obtained.

Example 13

To a reaction vessel equipped with a reflux condenser are added 45 parts of α-phenylacrylonitrile, 5 parts of vinylene carbonate, 250 parts of water, 2.5 parts of a cationic emulsifying agent, specifically cetyldimethylbenzylammonium chloride, and 0.5 part of ammonium persulfate. These monomers are in a ratio of approximately 85.7 molar percent of α-phenylacrylonitrile to 14.3 molar percent of vinylene carbonate. The vessel containing the resulting emulsion is heated on a steam bath for 4 hours. The copolymer of α-phenylacrylonitrile and vinylene carbonate that precipitates at the end of this period of time is collected on a Büchner funnel and washed with 2500 parts of water. The washed copolymer is dried in an oven at 70° C. for 2 hours, yielding a dry, white copolymer of α-phenylacrylonitrile and vinylene carbonate.

Example 14

The following ingredients are charged to a polymerization bottle:

|  | Parts | Approx. Molar Percent |
| --- | --- | --- |
| Butadiene | 64.0 | 66.2 |
| Acrylonitrile | 26.0 | 27.4 |
| Vinylene carbonate | 10.0 | 6.4 |
| Water | 150.0 | |
| Potassium persulfate | 0.20 | |
| Diisopropyl xanthogen disulfide | 0.30 | |
| Sodium diisobutylnaphthalenesulfonate | 3.6 | |
| Sodium pyrophosphate | .30 | |
| Sodium hydroxide | 0.05 | |
| Phenyl-β-naphthylamine | 3.0 | |

The butadiene is the last component added. Sixty-six (66) parts of butadiene is added, the two parts excess being allowed to vaporize off, after which the bottle is sealed from the atmosphere. The bottle is placed in a constant temperature bath maintained at 30° C. and tumbled end over end for 30 hours. The bottle is opened, and the copolymer of butadiene, acrylonitrile and vinylene carbonate is precipitated from the resulting latex by adding thereto an aqueous 5% sodium chloride solution containing 2% sulfuric acid. The precipitated copolymer, more particularly a ternary polymer or tripolymer, is isolated, washed free of soluble contaminants and dried in a vacuum oven. The dried copolymer can be worked by means of suitable masticating equipment (e. g.. a Banbury mixer followed by working on rolls) together with the usual synthetic rubber additives, e. g., a plasticizer, filler, reinforcing agent, lubricant, vulcanization agent, oxidation inhibitor, etc., and the homogeneous mass then can be molded, extruded, calendered or otherwise shaped into a wide variety of industrial and domestic articles or as components of such articles.

*Example 15*

The same procedure is followed as described under Example 13 with the exception that 45 parts of vinyl benzoate is employed instead of 45 parts of α-phenylacrylonitrile. The vinyl benzoate and vinylene carbonate are employed in a ratio of approximately 84 molar percent of vinyl benzoate to about 16 molar percent of vinylene carbonate. A fair yield of vinyl benozate-vinylene carbonate copolymer is obtained.

*Example 16*

|  | Parts | Approx. Molar Percent |
|---|---|---|
| Methyl α-chloroacrylate | 45.0 | 92.6 |
| Vinylene carbonate | 5.0 | 7.4 |
| Methyl ethyl ketone | 50.0 |  |
| Benzoyl peroxide | 0.25 |  | are charged to a glass reaction vessel which is flushed with nitrogen gas, and then placed in a water bath maintained at 65–70° C. for 4 hours. At the end of this polymerization period the contents of the vessel is diluted with water. The precipitated copolymer is collected by filtration through a Büchner funnel and then dried. The dry copolymer is a light cream in color.

*Example 17*

To a reaction vessel is added a solution of 8 parts of methyl vinyl ketone, 2 parts of vinylene carbonate, 90 parts of water and 0.1 part of ammonium persulfate. These monomers are in an approximate ratio of 83.1 molar percent of methyl vinyl ketone to 16.9 molar percent of vinylene carbonate. The solution is heated on a steam bath for 4 hours. At the end of this time a good yield of a copolymer of methyl vinyl ketone and vinylene carbonate is obtained.

*Example 18*

|  | Parts | Approx. Molar Percent |
|---|---|---|
| Acrylonitrile | 84 | 91.0 |
| Vinylene carbonate | 8 | 5.3 |
| Acrylamide | 4 | 3.2 |
| Allyl gamma-stearamidopropylmorpholinium bromide | 4 | 0.5 |
| Water | 900 |  |
| Potassium persulfate | 1 |  | are charged to a reaction vessel provided with a reflux condenser. Copolymerization is effected by refluxing the solution on a steam bath for 12 hours. The resulting copolymer, more particularly tetrapolymer, is collected on a Büchner funnel, washed with 2000 parts of water and dried in an oven at 70° C. for two hours. The dry copolymer of acrylonitrile, vinylene carbonate, acrylamide and allyl gamma-stearamidopropylmorpholinium bromide is more amenable to dyeing, especially toward acid dyes, than, for example, homopolymeric acrylonitrile.

Allyl gamma-stearamidopropylmorpholinium bromide is prepared, for example, as follows: To a reaction vessel are added 100 parts of gamma-stearamidopropylmorpholine and 200 parts of allyl bromide. Within a few minutes the solution becomes warm, indicating that quaternarization is taking place. The product solidifies on cooling. It is collected on a Büchner funnel, washed with 400 parts of benzene and dried in a vacuum desiccator for 1 hour. The resulting dry, white, water-soluble allyl gamma-stearamidopropylmorpholinium bromide is obtained in a yield amounting to 128 parts.

Instead of allyl gamma-stearamidopropylmorpholinium bromide in the above formulation, we may use any other quaternary ammonium compound of the kind disclosed and claimed in the copending application of one of us (John A. Price), Serial No. 301,987, filed July 31, 1952 (now abandoned in favor of copending application Serial No. 463,319, filed October 19, 1954, as a continuation-in-part of said application Serial No. 301,987), more particularly a quaternary ammonium compound represented by the general formula

IV

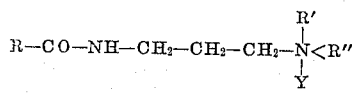

where R represents a radical selected from the class consisting of aliphatic and alicyclic hydrocarbon radicals containing at least 7 carbon atoms, R' represents an ethylenically unsaturated hydrocarbon radical having a terminal

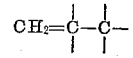

grouping and containing from 3 to 10 carbon atoms, inclusive, <R" in conjunction with the nitrogen atom to which it is bonded represents the residue of a heterocyclic tertiary amine and Y represents an anion.

It will be understood, of course, by those skilled in the art that our invention is not limited to the specific ingredients named in the above illustrative examples nor to the particular proportions and methods of copolymerization mentioned therein. Thus in addition to or instead of the acrylamide and quaternary ammonium salt named in Example 18, other modifying copolymerizable substances (that is to say, a copolymerizable substance or substances, including a comonomer or a plurality of comonomers, other than vinylene carbonate and other than a compound embraced by Formula I) can be used to prepare new and useful copolymers having particular properties which render the copolymer best adapted for a particular service application. Illustrative examples of such modifying copolymerizable substances and, also, of compounds of the kind embraced by Formula I are given in, for example, the aforementioned copending Price application Serial No. 301,987; in copending Price application Serial No. 301,365, filed July 28, 1952, now Patent No. 2,654,729, dated October 6, 1953; in copending Thomas application Serial No. 317,370, filed October 28, 1952, now Patent No. 2,712,004, dated June 28, 1955; and in the patents to which reference is made in the aforesaid applications.

The proportions of any modifying copolymerizable substance or substances that are incorporated in the polymerizable composition together with the vinylene carbonate and the compound or compounds of the kind embraced by Formula I can be varied considerably. Ordinarily, however, the total amount of vinylene carbonate and the compound embraced by Formula I constitutes at least 40 percent, and generally a major or preponderant proportion (more than 50 percent), by weight of the total amount of materials to be copolymerized, and the modifying copolymerizable substance or substances (if present in the polymerizable mixture) constitute the remainder of the total amount of copolymerizable ingredients which are subjected to copolymerization. In these polymerizable compositions the vinylene carbonate and the compound of the kind embraced by Formula I are present therein in the ratio of from 5 to 50 molar percent of the former to from 95 to 50 molar percent of the latter. However, in some instances it may be desirable to use either slightly lower or a little higher molar percentages than those just set forth in order to produce a copolymer having particular properties that are required in order to meet a particular service application of the copolymer, for instance from about 2 or 3 to about 60 (or even as high as, say, 70 or 75) molar percent of vinylene carbonate to from about 97 or 98 to about 40 (or even as low as, say, 30 or 25) molar percent of a comonomer or comonomers of the kind embraced by Formula I.

Although many of the new copolymers of this invention, especially the acrylonitrile copolymers, are particularly useful in the formation of fibers or filaments, which are more amenable to dyeing than products comprising homopolymeric acrylonitrile, they also have numerous other applications in the plastics and coating arts. For instance, with or without a filler or other additive, they may be used as molding compositions or as components of molding compositions from which molded articles are produced by molding the composition under heat and pressure, e. g., at temperatures of the order of 130° C. or 140° C. to 200° C. and under pressures up to 10,000 lbs. or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of our invention also can be employed in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated. Fibers can be produced from many of the copolymers of the present invention, especially the acrylonitrile copolymers and more particularly those wherein the copolymer contains a preponderant proportion of acrylonitrile combined in the copolymer molecule, by a number of different methods; for instance, they can be prepared in the manner described in, for example, Cresswell Patent Nos. 2,558,730 and 2,558,731 and Cresswell and Wizon Patent No. 2,558,733. The polymerizable compositions and polymerization products of this invention have numerous other uses, for instance uses such as are given in Drechsel and Padbury Patent No. 2,550,652. The copolymers also can be employed as intermediates from which other new and useful synthetic compositions are made by suitably treating the copolymer with a chemical that is reactive therewith.

We claim:

A composition comprising a copolymer of copolymerizable ingredients including vinylene carbonate, acrylonitrile, acrylamide and allyl gamma-stearamidopropyl-morpholinium bromide, said copolymerizable mixture containing approximately 91.0 molar percent of acrylonitrile, 5.3 molar percent of vinylene carbonate, 3.2 molar percent of acrylamide and 0.5 molar percent of allyl gamma-stearamidopropyl-morpholinium bromide.

References Cited in the file of this patent

UNITED STATES PATENTS 2,563,771    Adelson _____ Aug. 7, 1951

OTHER REFERENCES

Newman et al.: Journal of American Chemical Society, vol. 75, pages 1263–4, March 5, 1953.